United States Patent [19]

Saito et al.

[11] Patent Number: 5,535,077

[45] Date of Patent: Jul. 9, 1996

[54] MAGNETORESISTIVE HEAD HAVING MAGNETICALLY BALANCED MAGNETORESISTIVE ELEMENTS LAMINATED ON OPPOSITE SIDES OF AN ELECTRICALLY CONDUCTIVE FILM

[75] Inventors: Norio Saito, Miyagi; Yutaka Soda, Kanagawa, both of Japan

[73] Assignee: Sony Corporation, Tokyo, Japan

[21] Appl. No.: 356,533

[22] Filed: Dec. 15, 1994

[30] Foreign Application Priority Data

Dec. 28, 1993 [JP] Japan .................................. 5-336267

[51] Int. Cl.$^6$ .................................................. G11B 5/39
[52] U.S. Cl. ........................................ 360/113; 360/126
[58] Field of Search ................................. 360/113, 125, 360/126; 338/32 R; 324/252

[56] References Cited

U.S. PATENT DOCUMENTS

| | | | |
|---|---|---|---|
| 4,802,043 | 1/1989 | Sato et al. ........................ | 360/113 |
| 5,065,483 | 11/1991 | Zammit .............................. | 29/603 |
| 5,247,413 | 9/1993 | Shibata et al. .................... | 360/113 |
| 5,272,582 | 12/1993 | Shibata et al. .................... | 360/113 |
| 5,323,285 | 6/1994 | Smith ................................ | 360/113 |
| 5,337,203 | 8/1994 | Kitada et al. ..................... | 360/113 |
| 5,371,643 | 12/1994 | Yuito et al. ....................... | 360/113 |
| 5,406,433 | 4/1995 | Smith ................................ | 360/113 |
| 5,442,507 | 8/1995 | Koga et al. ....................... | 360/113 |

FOREIGN PATENT DOCUMENTS 1251412 2/1990 Japan .

*Primary Examiner*—Stuart S. Levy
*Assistant Examiner*—Jefferson Evans
*Attorney, Agent, or Firm*—Hill, Steadman & Simpson

[57] ABSTRACT

A magnetoresistive effect magnetic head having a film comprising laminated first and second magnetoresistive elements with an electrically conductive intermediate film therebetween, and a pair of shield members positioned on both sides of the laminated film. Even if a magnetic gap of the head is reduced in length, the magnetic equilibrium of the first and second magneto-resistive elements may be stabilized by allowing over 10% of the current through the film to go through the intermediate film, thereby enabling a high playback output to be produced when reproducing signals on a magnetic medium.

2 Claims, 5 Drawing Sheets

MAGNETORESISTIVE HEAD HAVING MAGNETICALLY BALANCED MAGNETORESISTIVE ELEMENTS LAMINATED ON OPPOSITE SIDES OF AN ELECTRICALLY CONDUCTIVE FILM

BACKGROUND OF THE INVENTION

The invention relates to a magnetoresistive (MR) head for reproducing information signals recorded on a magnetic recording medium by detecting changes in electrical resistance caused by the direction of magnetization of a magnetoresistive element being rotated on the basis of a magnetic field produced by recording magnetization of information signals recorded on a magnetic recording medium, such as a magnetic disc or magnetic tape.

There has hitherto been proposed a magneto-resistive head employing a magnetoresistive effect element formed of a magnetic alloy, such as permalloy, exhibiting a magneto resistive effect in which the electrical resistance is changed in accordance with the direction of spontaneous magnetization.

Such a magnetoresistive head is a magnetic flux responsive head that is now in widespread use. Since it is superior in response sensitivity to signals in the short wavelength range as contrasted to a magnetic head operating under electromagnetic induction, it makes possible reproduction of high-frequency signals. On the other hand, the length of the magnetic head can be reduced to contribute to reducing the width of the recording track formed on the recording medium. Besides, information signals can be reproduced with high sensitivity even with the magnetic recording medium run at a low velocity.

In general, a single-layer thin permalloy film is employed in a magnetoresistive element (MR element). The magnetoresistive head employing such single-layer thin permalloy film is subject to Barkhausen noise due to the movement of the magnetic wall. Since the MR element assumes a magnetic domain structure tending to hold the state of minimizing the sum of magnetostatic energies brought about by the energy of magnetic anisotropy or shape anisotropy for the entire layer, the magnetic wall is displaced if an external magnetic field is applied to the layer, thus producing the Barkhausen noise.

There is shown in JP Patent Kokai Publication A-1-251412 a magnetoresistive head designed to evade such Barkhausen noise. With the magnetoresistive head disclosed in this Publication, a pair of MR elements are laminated with a non-magnetic intermediate layer in-between to form a laminated MR element film, the front and rear ends of which are fitted with electrodes for passing the sense current. The laminated MR element film is sandwiched between a pair of shield magnetic members with an insulating film in-between, and a bias conductor is provided between one of the shield magnetic member and the laminated MR element film.

With the MR element of a stacked film structure, the easy axes of the upper and lower MR elements on either side of the non-magnetic intermediate layer become parallel to each other, while the directions of magnetization produced by passage of the sense current become opposite to each other, so that the MR elements cannot assume plural magnetic domains within the same plane, as a result of which the Barkhausen noise is prevented from being produced with the displacement of the magnetic wall.

If, with the MR elements of the laminated film structure, the magnetic gap is of a larger gap length, output stability is optimum because the magnetic equilibrium of the upper and lower MR elements is not disturbed by the shield magnetic member.

However, if the magnetic gap length is extremely narrow, such as 0.35 μm or less, the shield magnetic member cannot be magnetically separated from the upper and lower MR elements, such that the magnetic equilibrium between the upper and lower MR elements becomes collapsed, as a result of which the output of the MR head becomes unstable.

OBJECTS AND SUMMARY OF THE INVENTION

It is an object of the present invention to provide a novel MR head having a narrow length of the magnetic gap.

It is another object of the present invention to provide an MR head in which it is possible to maintain magnetic equilibrium of a pair of MR elements laminated with a non-magnetic intermediate layer in-between to render it possible to prevent the playback output from being lowered.

It is yet another object of the present invention to provide an MR head in which it is possible to record information signals on a magnetic recording medium with high recording density.

The magnetoresistive effect magnetic head according to the present invention has a first magnetoresistive effect element and a second magnetoresistive effect element laminated with an electrically conductive intermediate film in-between, and a pair of shield magnetic members arranged on both sides of the laminated magnetoresistive effect film in the direction of the film thickness, with an insulating film in-between.

With the magnetoresistive effect magnetic head of the present invention, the relation $I_m/I_t > 0.1$ holds, where $I_m$ is the current supplied to the electrically conductive intermediate film and $I_t$ is the current through the first and second magnetoresistive effect elements in their entirety.

With the magnetoresistive effect magnetic head of the present invention, the intermediate film is a film of a high-melting metal having a melting point not lower than the melting point of the magnetoresistive effect elements.

Other objects and advantages of the present invention will become apparent from the following description of the preferred embodiment and the claims.

DETAILED DESCRIPTION OF THE DRAWINGS

Figure 3:
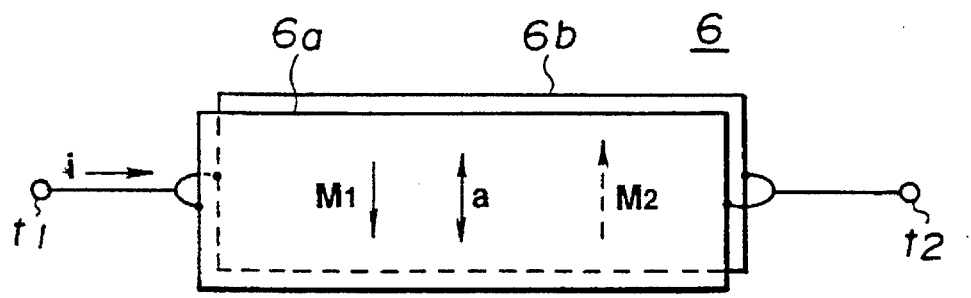
Figure 3:
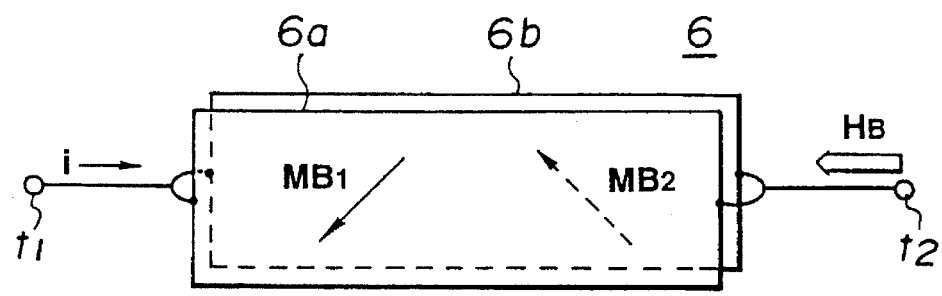
Figure 3:
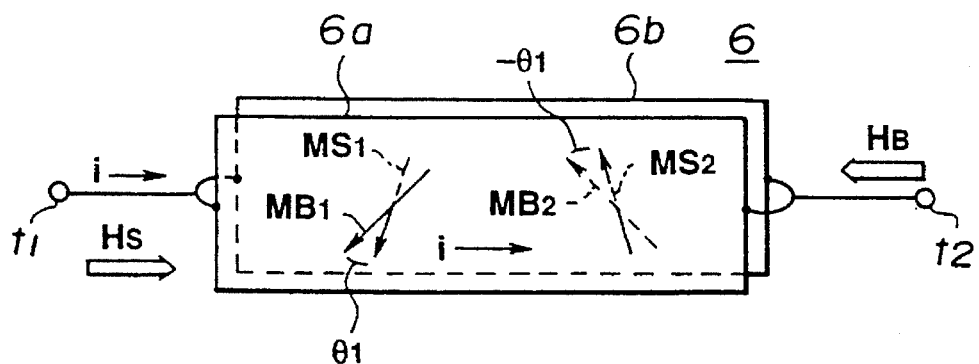

FIG. 3A schematically shows the direction of magnetization of an MR element in an initial state.

FIG. 3B schematically shows the direction of magnetization of the MR element on application of the bias magnetic field.

FIG. 3C schematically shows the direction of magnetization of the MR element on application of a signal magnetic field.

Figure 4:
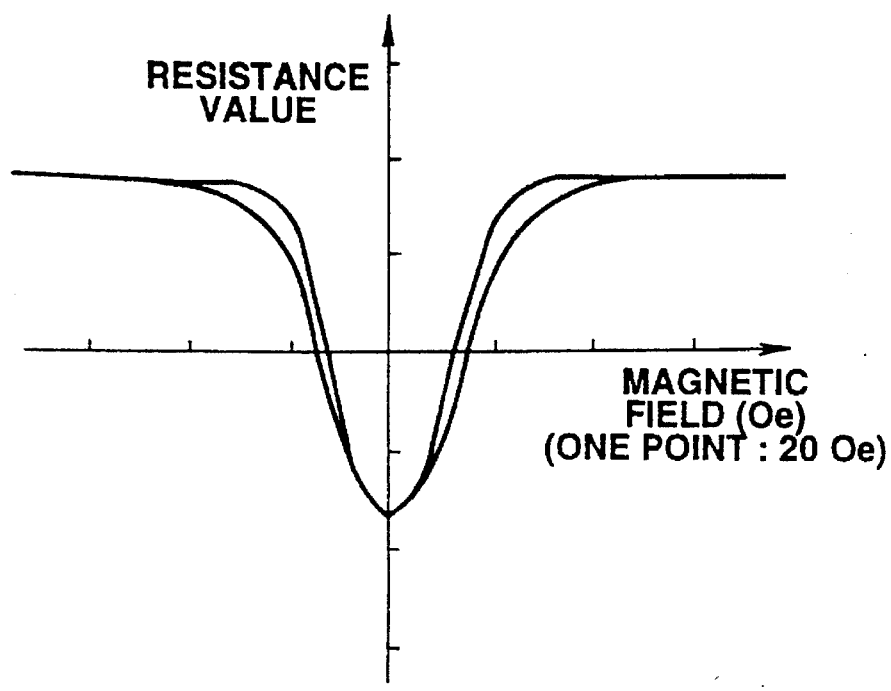
Figure 4:
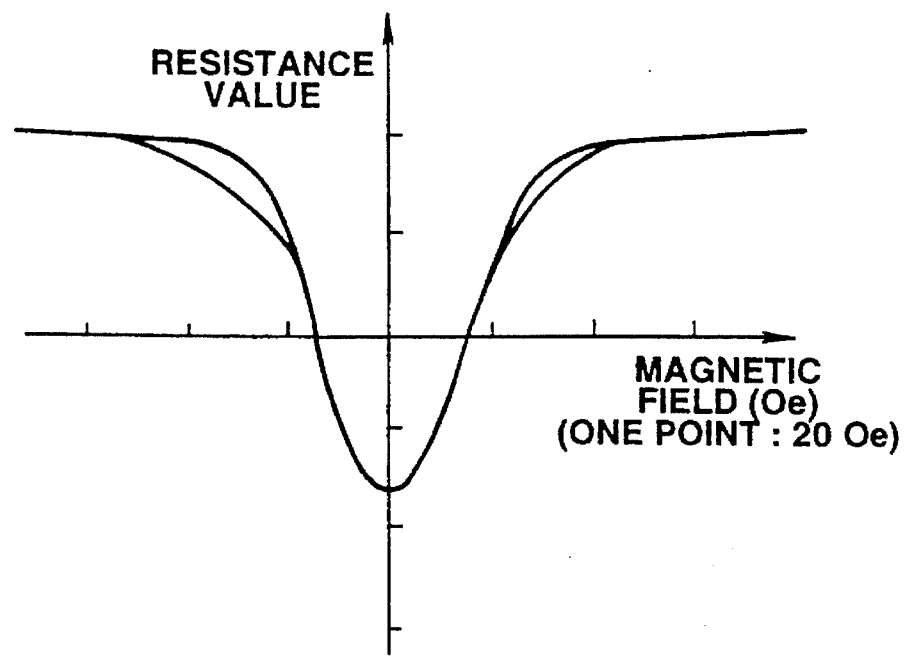

FIGS. 4A and 4B show stable and smooth MR characteristics brought about by increasing the sense current, FIG. 4A being a graph showing MR characteristics for the sense current of 1 mA and FIG. 4B showing MR characteristics for the sense current of 10 mA.

Figure 5:
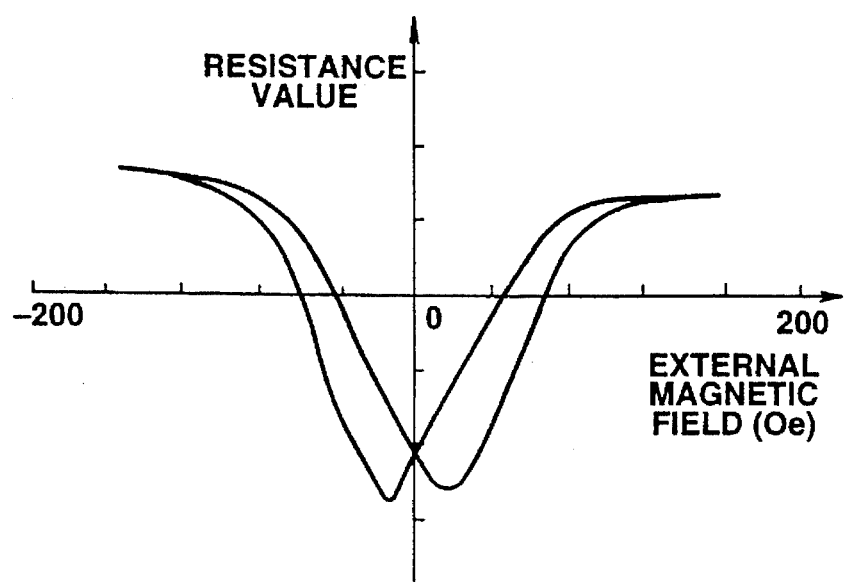

FIG. 5 is a graph showing the results of experiments on MR characteristics for varying film thicknesses of each of the MR element provided above and below the intermediate film.

Figure 8:
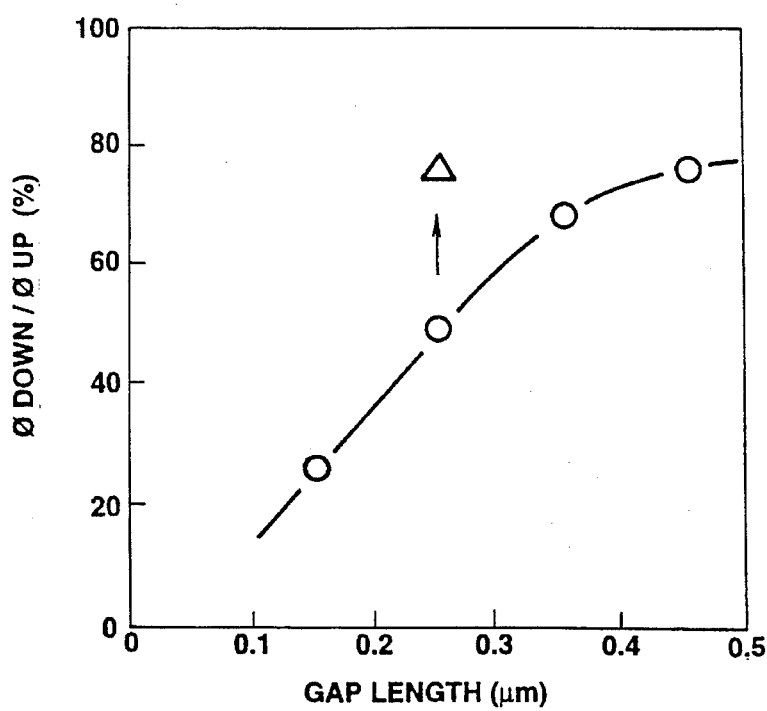

FIG. 8 is a graph showing the results of calculations on MR characteristics for varying film thicknesses of each of the MR element provided above and below the intermediate film.

Figure 7:
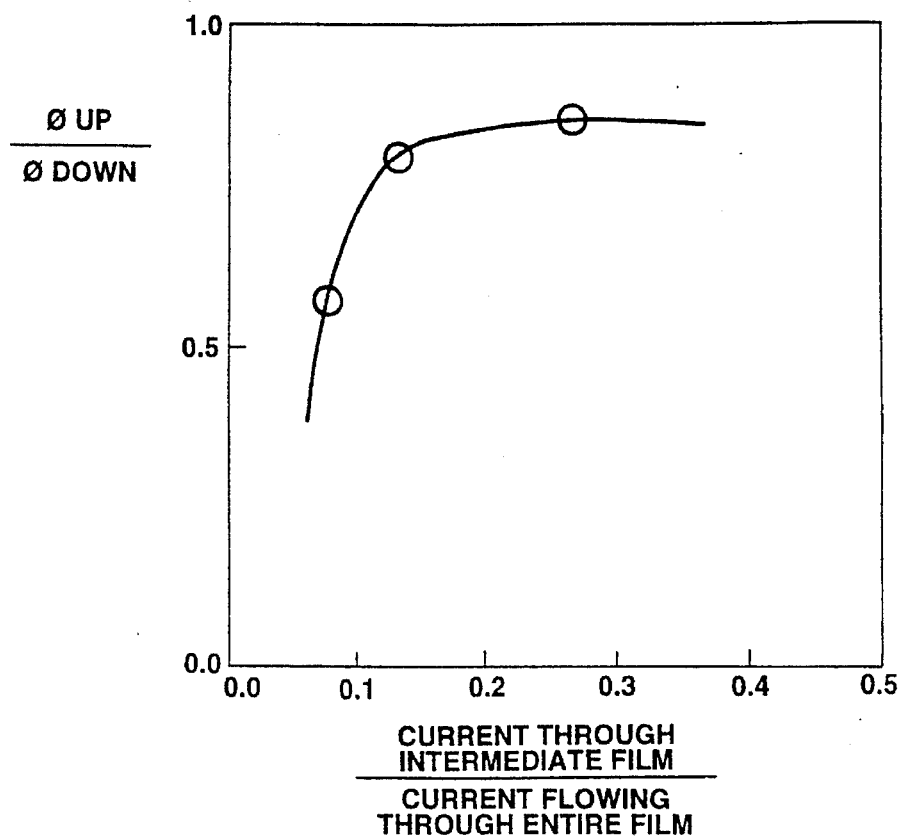

FIG. 7 is a graph showing the manner in which the magnetic equilibrium of the upper and lower MR elements is changed with changes in the ratio of the current through the intermediate film to the current through the stacked MR element film in its entirety.

FIG. 8 is a graph showing changes in the magnetic equilibrium of the upper and lower MR elements for changes in the gap length of the magnetic gap.

DESCRIPTION OF THE PREFERRED EMBODIMENT

Referring to the drawings, a magnetoresistive head according to a preferred embodiment of the present invention will be explained in detail.

Figure 1:
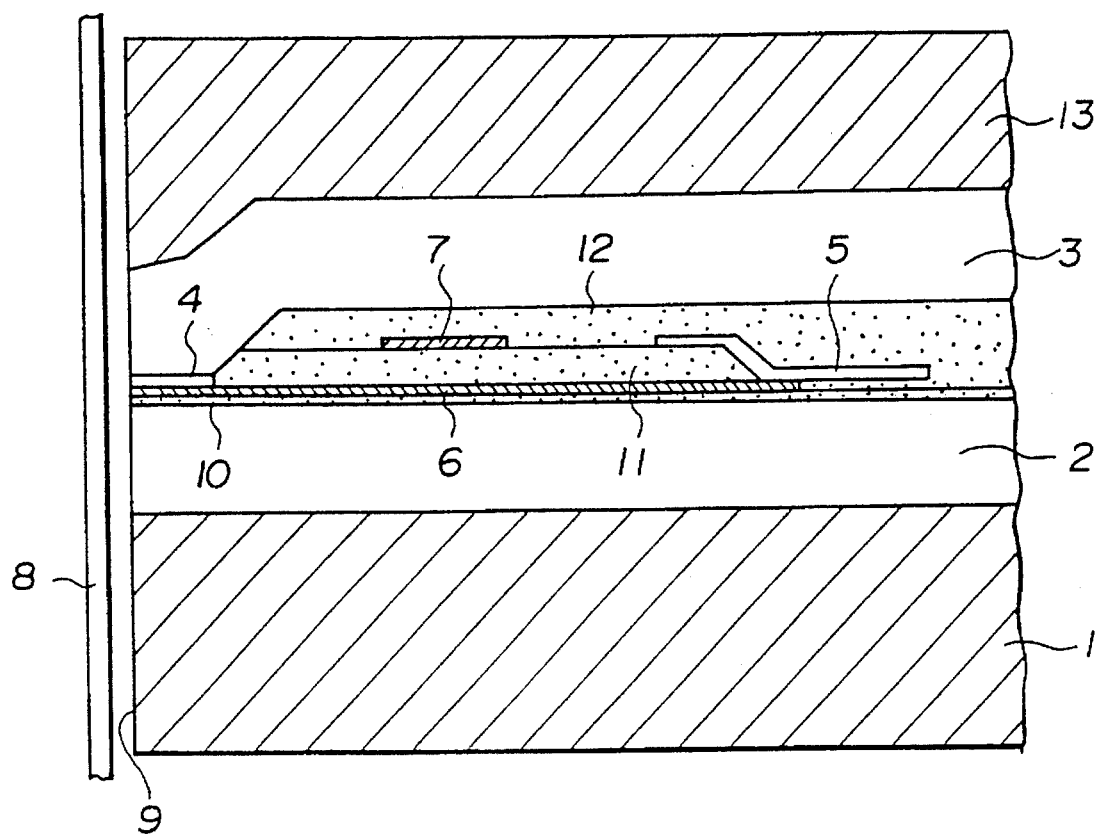
FIG. 1 is an enlarged cross-sectional view showing an embodiment of an MR head according to the present invention.

Referring first to FIG. 1, the present magnetoresistive head has a pair of shield magnetic members 2, 3 laminated on a substrate 1 formed of a non-magnetic material, such as ceramics or glass, with a pre-set distance therebetween. The MR head also includes a laminated MR element film 8, having a front electrode 4 and a rear electrode 5 laminated between the shield magnetic members 2, 3, and a bias magnetic field impressing member 7 for impressing a bias magnetic field to the laminated MR element film 6.

The shield magnetic member 2 constituting a lower layer is termed a lower shield magnetic member 2, while the shield magnetic member 3 constituting an upper layer is termed an upper shield magnetic member 2.

The laminated MR element film 6 has a substantially rectangular plan configuration, with the longitudinal direction thereof extending at right angles to an abutment surface (ABS surface) 9 relative to a magnetic recording medium 8. The front lateral side of the laminated MR element film 6 faces the ABS surface 9.

Figure 2:
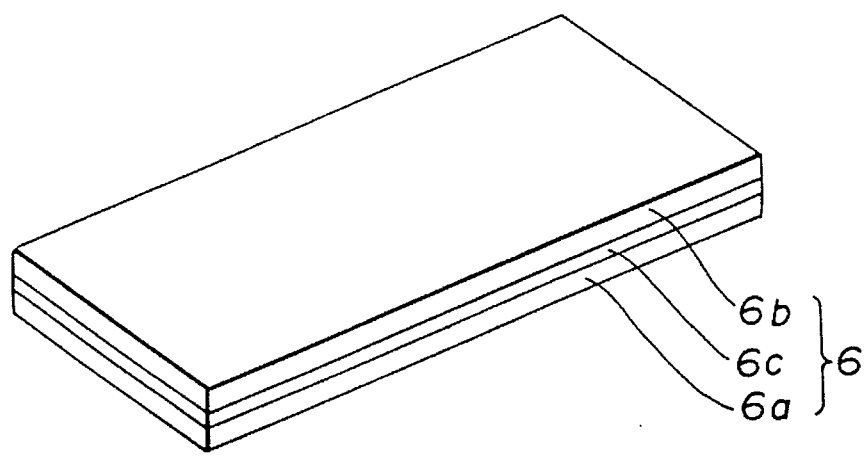
FIG. 2 is an enlarged perspective view showing a laminated MR element film.

Such laminated MR element film 6 is made up of a first MR element 6a and a second MR element 6b, that are magnetic thin films of permalloy or the like magnetic material, and an intermediate film 6c, as shown in FIG. 2. The first and second MR elements 6a, 6b face each other with the intermediate film 6c inbetween. That is, the laminated MR element film 6 has a laminated structure comprising the first and second MR elements 6a, 6b and the intermediate film 6c in-between for stabilizing the magnetic domain structure.

The first MR element 6a, intermediate film 6c and the second MR element 6b are laminated by vacuum thin film forming means, such as vapor deposition or sputtering, on a first insulating layer 10 playing the role of a gap film constituting a magnetic gap formed on the lower shield magnetic member 2.

The operation of the laminated MR element film 6 is now explained. In an initial state, each of the first MR element 6a and the second MR element 6b has an easy axis a in a direction indicated in FIG. 3A. That is, each of the elements 6a, 6b has the easy axis in a direction at right angles to a line interconnecting terminals $t_1$, $t_2$ when the sense current i flows between these terminals $t_1$, $t_2$.

When the sense current i flows through these elements 6a, 6b, antiparallel magnetic fields are generated in the MR elements 6a, 6b on both sides of the intermediate film 6c in a direction at right angles to the sense current i, whereby the elements 6a, 6b are magnetized as indicated by a solid-line arrow $M_1$ and a broken-line arrow $M_2$, respectively.

When an external bias magnetic field $H_B$ is applied to the laminated MR element film 6 in a direction along the sense current i as shown in FIG. 3B, the directions of magnetization of the first MR element 6a and the second MR element 6b are rotated by this bias magnetic field $H_B$ a pre-set angle as indicated by a solid-line arrow $MB_1$ and a broken-line arrow $MB_2$ in FIG. 3B.

The magnitude of the bias magnetic field $H_B$ is selected so that the direction of magnetization applied by such bias magnetic field makes an angle of approximately 45° relative to the direction of the sense current i. The bias magnetic field $H_B$ is produced by the above-mentioned bias magnetic field impressing member 7.

The bias magnetic field $H_B$ inducing magnetization of approximately 45° with respect to the sense current i is a customary measure adopted in conventional MR heads for producing the operation in a portion of a magnetic field-resistance characteristic curve showing high sensitivity and linearity.

If the signal magnetic field $H_S$ is applied in a direction along the sense current i, that is along the difficult axis, magnetization is rotated such that the respective directions of magnetization are rotated by angles $\Theta_1$ and $-\Theta_1$ counterclockwise and clockwise as indicated by arrows $MS_1$, $MS_2$ in FIG. 3C, respectively. This induces changes in resistance in the first MR element 6a and in the second MR element 6b. Since the changes in resistance of the MR elements 6a and 6b are proportional to $\cos^2\Theta$ where $\Theta$ is a change in angle, the MR elements 6a, 6b in FIG. 3B undergo the same changes in resistance in the increasing direction or in the decreasing direction with respect to magnetization $MB_1$ and $MB_2$.

In other words, if the resistance of the first MR element 6a is increased, that of the second MR element 6b is also changed in the increasing direction. These changes in resistance of the MR elements 6a, 6b may be detected as voltage changes across the terminals $t_1$, $t_2$ of the laminated MR element film 6.

The front end electrode 4 is directly laminated on the front end of the laminated MR element film 6 so that its lateral side edge faces the ABS surface 9 so as to be electrically connected to the laminated MR element film 6. Since the front end electrode 4 supplies the sense current to the laminated MR element film 6 and acts as a magnetic gap film, it is formed of a non-magnetic electrically conductive material, such as Ti or Cr.

The rear end electrode 5 is directly laminated on the laminated MR element film 6 at the rear end thereof and is partially laminated on a second insulating layer 11 provided on the laminated MR element film 6. The rear end electrode 5 is formed of a magnetic electrically conductive material.

The bias magnetic field impressing member 7 is a stripe-shaped conductor pattern formed of a non-magnetic electrically conductive material, and is formed on a second insulating layer 11 provided on the laminated MR element film at a position intermediate between the front end electrode 4 and the rear end electrode 5. The bias magnetic field impressing member 7 is provided in a direction substantially at right angles to the longitudinal direction of the laminated MR element film 6, that is in a direction normal to the drawing sheet, and a bias current from a dc source is supplied across its both terminals.

Thus the dc current flows along the track width, that is in the longitudinal direction of an interconnection pattern, so that the bias magnetic field is impressed along the longitudinal direction of the laminated MR element film 6. The bias magnetic field impressing member 7 may also be a permanent magnet formed of samarium-cobalt or neodymium alloy in place of the conductor pattern.

The lower shield magnetic member 2 operates in conjunction with the upper shield magnetic member 3 for shielding the effect of the magnetic field emanating from the recording track of the recording medium 8 which is spaced apart from the laminated MR element film 6. Such lower shield magnetic member 2 is formed of a magnetic material, such as permalloy, and is deposited on the substrate i by vacuum deposition, sputtering or plating. The lower shield magnetic member 2 is mounted extending in a direction normal to the ABS surface 9 so that its lateral edge faces the ABS surface 9.

Similarly to the lower magnetic shield member 2, the upper shield magnetic member 3 is mounted extending in a direction normal to the ABS surface 9 so that its lateral edge faces the ABS surface 9. The upper shield magnetic member 3 is directly laminated on the side of the ABS surface 9 on the front end electrode 4, while being laminated at its mid portion via a third insulating layer 12 provided overlying the bias magnetic field impressing member 7 and being directly contacted on the rear end side with the lower shield magnetic member 2.

On the top of the upper shield magnetic member 3 is formed a protective layer 13 for protecting the MR head. The protective layer 13 is formed of a non-magnetic electrically conductive material, such as $Al_2O_3$ or $SiO_2$.

Meanwhile, our experiments have indicated that, if the MR elements 6a, 6b are of a laminated film structure, smooth and stable MR characteristics may be realized by increasing the sense current flowing through the laminated films. FIGS. 4A and 4B show MR characteristics when the sense currents of 1 mA and 10 mA flow through the laminated films, respectively. It is seen from the results of the experiments that smoother MR characteristics may be realized for the sense current of 10 mA.

Figure 6:
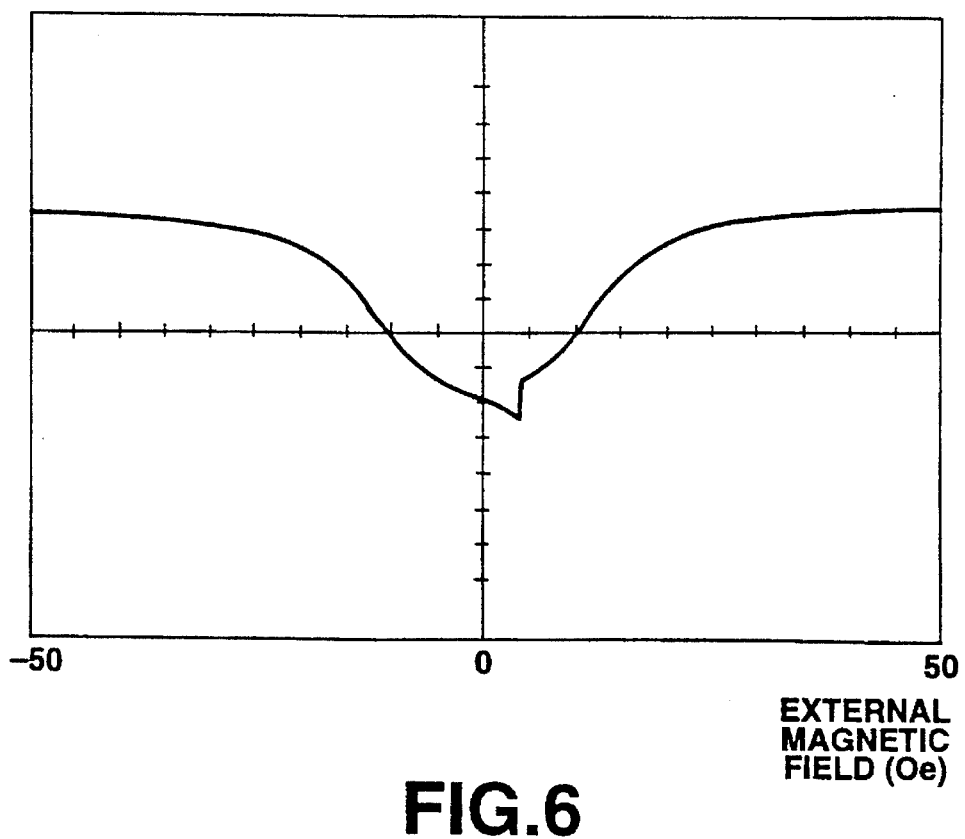

On the other hand, the results of our experiments and calculations have indicated that output stability may be achieved if the magnetic flux generated in the first MR element 6a is equal to that generated in the second MR element 6b. FIGS. 5 and 6 show the results of the experiments and the calculations, respectively. In FIGS. 5 and 6, the film thickness of the first MR element 6a is set to 400 Å, while that of the second MR element 6b is set to 300 Å. It is seen from these results that, if the magnetic flux of the first MR element is not equal to that of the second MR element 6b, there is produced a skip in the MR characteristics, and the MR head is deteriorated in output stability.

On a other hand, if the gap length is not more than 0.35 μm, the magnetic equilibrium between the first MR element 6a and the second MR element 6b is collapsed. It has however been seen that output stability may be achieved if the magnetic flux of the MR element 6a is not less than 80% of that of MR element 6b, as shown in FIG. 8. In this figure, A stands for a value obtained on flowing the current through the intermediate film 6c having a film thickness of 100 Å. Thus it is seen that the magnetic equilibrium can be re-established by flowing the current through the intermediate film 6c.

It has been concluded from above that the magnetic equilibrium between the first MR element 6a and the second MR element 6b may be re-established by forming the intermediate film 6c of an electrically conductive material and by increasing the magnetic field by the sense current.

It is desirable to form the intermediate film 6c of a high-melting metal having a melting point not lower than the melting point of the MR elements 6a, 6b. The high-melting metal may be exemplified by stable metals, such as Ta, Mo or W, that are scarcely reacted with the MR elements 6a, 6b formed of permalloy. In addition to the high-melting metal film, carbon films capable of passing a small current therethrough may also be employed as the intermediate film 6c.

The ratio of the current through the intermediate film 6c is selected to satisfy the relation $I_m/I_t > 0.1$, where $I_m$ is the current flowing through the intermediate film 8c and $I_t$ is the current flowing through the film in its entirety, including the first and second MR elements 6a, 6b in their entirety. This is based on the fact that the magnetic balance may be re-established with the current through the intermediate film 6c being not less than 10%, as may be seen from FIG. 7 showing the degree of re-establishment of the magnetic balance for the increasing ratio of the current $I_m$ through the intermediate film 6c to the current $I_t$ through the laminated MR element film 6 in its entirety. That is, even if the gap length is not more than 0.35 μm, magnetic balance may be stabilized by flowing the current through the intermediate film 6c.

What is claimed is:

1. A magnetoresistive effect magnetic head comprising:

a laminated magnetoresistive effect film comprising an electrically conductive intermediate film with unshorted first and second magnetoresistive effect elements laminated on opposite sides of the electrically conductive intermediate film, the laminated magnetoresistive effect film being substantially rectangular in shape, the electrically conductive intermediate film being made from material selected from the group consisting of stable metals that scarcely react with permalloy and carbon films capable of transmitting small currents therethrough;

a pair of shield magnetic members arranged so that such shield magnetic members are positioned on opposite sides of the laminated magnetoresistive effect film in a direction of the thickness of the laminated magnetoresistive effect film with insulating layers positioned between the magnetoresistive effect film and each of said shield magnetic members;

a front electrode positioned on an end of said laminated magnetoresistive effect film designed to face a magnetic recording medium, said first electrode being positioned between one of the shield magnetic members and the laminated magnetoresistive effect film;

a rear electrode positioned on an end of the laminated magnetoresistive effect film opposite the end at which the front electrode is positioned, said rear electrode extending beyond the end of the laminated magnetoresistive effect film; and a magnetic film biasing member operatively positioned for impressing a bias magnetic field on the laminated magnetoresistive effect film, wherein, the magnetoresistive head has a magnetic gap with a magnetic gap length of not more than 0.35"μ, the intermediate film has a melting point not lower than a melting point of the first and second magnetoresistive effect elements, and $I_m$ represents current transmitted through the electrically conductive intermediate film and $I_t$ represents current transmitted through the laminated magnetoresistive effect film in its entirety and the magnetoresistive effect film is configured such that $I_m/I_t$ is greater than 0.1 thereby effective to maintain a magnetic balance between the first and second magnetoresistive elements.

2. The magnetoresistive effect head as claimed in claim 1, wherein said stable metals are selected from the group Ta, Mo and W.

* * * * *